Nov. 9, 1943.  W. H. CURTIS  2,333,707
MACHINE FOR WASHING FOOD PRODUCTS
Filed April 8, 1941  2 Sheets-Sheet 1
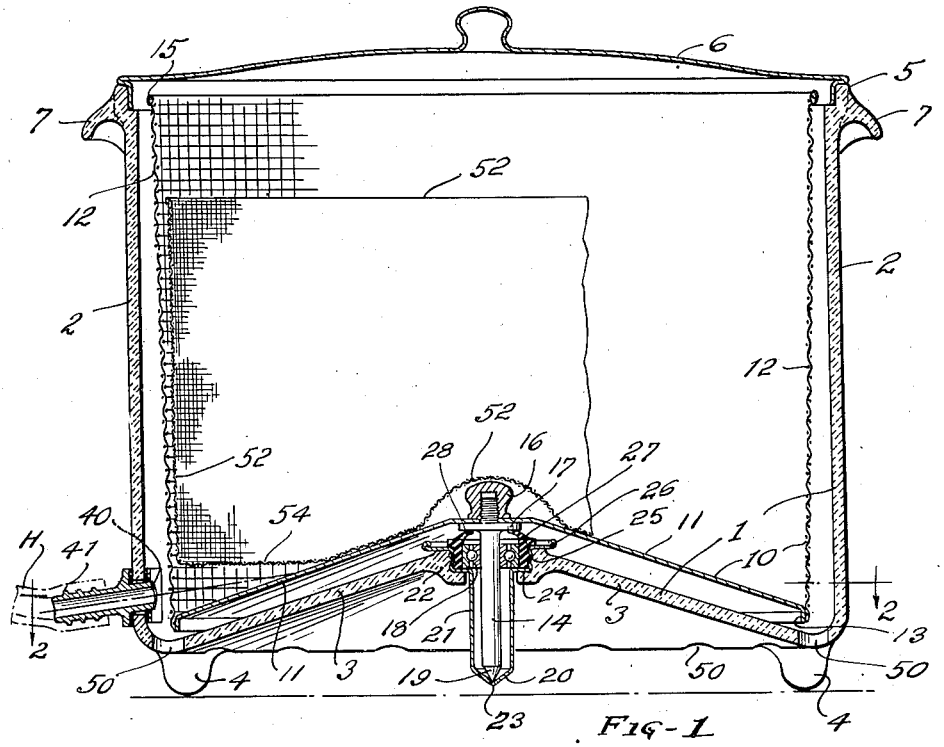
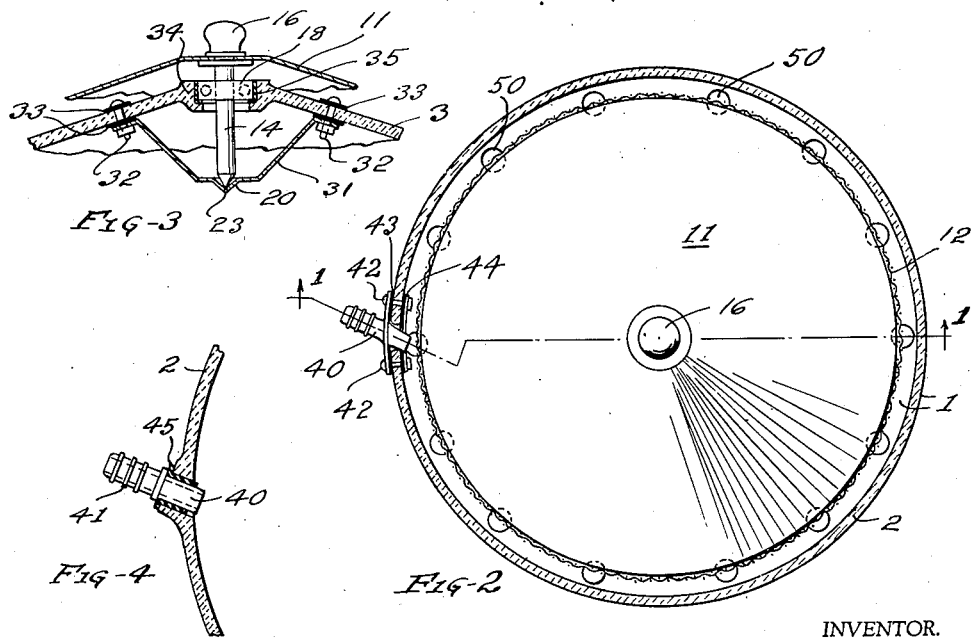
INVENTOR.
WILLIAM H. CURTIS
BY
*George M. Soule*
ATTY.

Nov. 9, 1943. W. H. CURTIS 2,333,707
MACHINE FOR WASHING FOOD PRODUCTS
Filed April 8, 1941 2 Sheets-Sheet 2

INVENTOR.
WILLIAM H. CURTIS
BY
ATT'Y.

Patented Nov. 9, 1943

2,333,707

UNITED STATES PATENT OFFICE 2,333,707

MACHINE FOR WASHING FOOD PRODUCTS

William H. Curtis, Bedford Heights, Ohio

Application April 8, 1941, Serial No. 387,393

3 Claims. (Cl. 146—200)

This invention relates to a machine for washing garden and like products in preparing such for the table.

An object is to provide a machine which will tumble such products while washing them, and which can be power-driven by water from the usual water tap. Other objects include the provision of a simple and inexpensive machine for the purpose indicated above, which machine is capable of being supported for operation in an ordinary kitchen sink for drainage thereinto powered by water through a hose attached to the usual water faucet as by a slip-on coupling, and capable of washing any kind of food products, i. e., leaf plants, root plants, grains, berries, etc., quickly and without doing any damage to them.

Other objects will be pointed out in or become apparent from the following description of various preferred forms. The essential characteristics are summarized in the claims.

Figure 5:
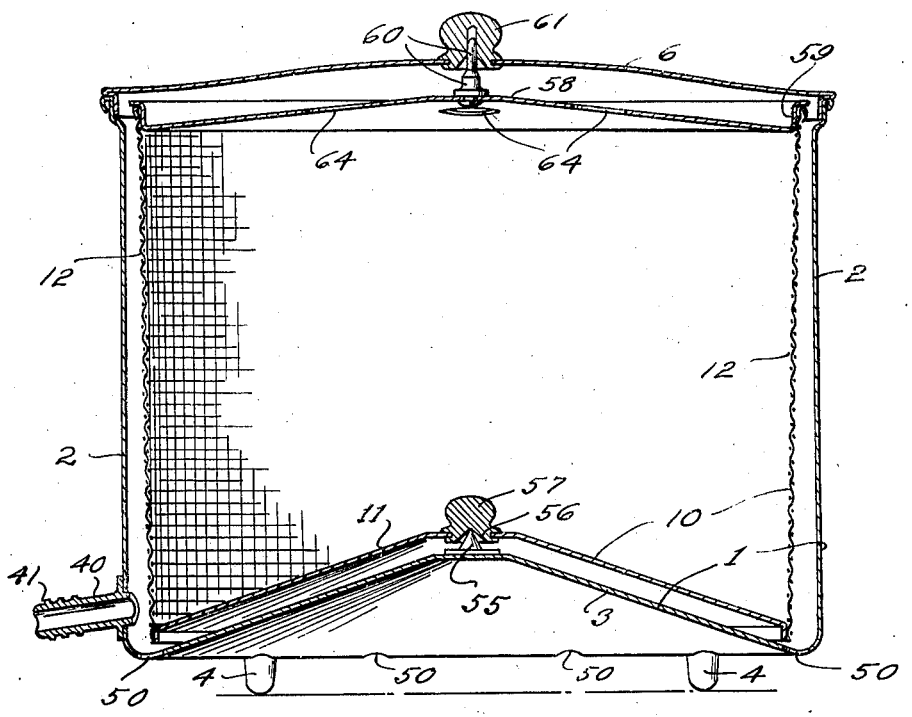
Figure 6:
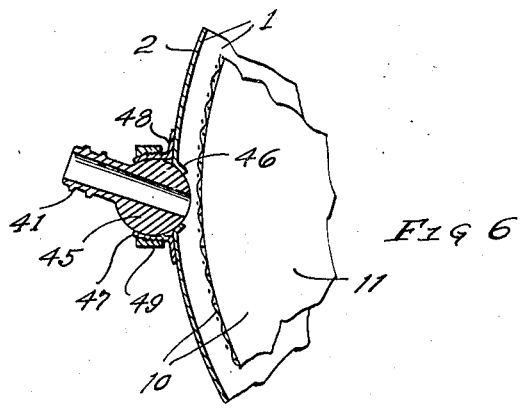

In the drawings Fig. 1 is a vertical central sectional assembly view of the machine (plane of section indicated on Fig. 2 at 1—1); Fig. 2 is a sectional plan view taken substantially as indicated at 2—2 on Fig. 1; Fig. 3 is a fragmentary central vertical sectional view of a modified bearing support for a rotor in a construction on the order of that of Fig. 1; Fig. 4 is a fragmentary horizontal sectional view of a modified hose coupling mounting and water nozzle; Fig. 5 is a sectional assembly view similar to Fig. 1, showing further modifications, and Fig. 6 is a fragmentary horizontal sectional view similar to the left hand portion of Fig. 2, showing a universally adjustable water nozzle and hose mounting.

Referring first to the form shown in Figs. 1 and 2, the main supporting body or frame of the machine is indicated generally at 1, the same being in the form of a container having an upright circular wall 2, preferably substantially cylindrical, a bottom wall 3 and supporting legs 4. Preferably there are three supporting legs equally spaced apart and rigid with the body 1 as at the juncture of the walls 2 and 3 thereof. The side wall 2, as shown, terminates upwardly at a flange 5 which may be offset outwardly from the main portion of the wall 2 to provide a seat for a cover 6. The cover and connection thereof with the body wall 2 are intended as illustrative of suitable means for closing the open top of the body so that water will not splash out of the top during operation of the machine. The body 1, as shown, is a molding comprising glass or other transparent material so that the washing operation can be observed therethrough. The cover can also be wholly or partially transparent, e. g., a glass plate, to provide an observation window at the top (not illustrated).

Suitable handles for the body 1 can be molded thereon as at 7 or attached thereto in suitable fashion.

Mounted within the body 1 is a rotor 10 which constitutes an inner container for the products to be cleaned. The rotor is provided with bearings capable of enabling the rotor to be turned very easily during the washing operation. As shown in Figs. 1, 2 and 5 the rotor comprises a generally imperforate circular disc 11 which is steeply convex on its upper side (conical sheet metal piece as shown); which disc carries a perforate wall member 12, peripherally attached thereto all around the disc as at a flange 13 of the latter. In Fig. 1 a downwardly projecting spindle shaft 14 is shown attached to the disc 11 centrally thereof for engagement with supporting bearings on the base to be described presently.

The perforate wall member 12, as shown, is a nearly cylindrical tube of open wire mesh, say with $\tfrac{3}{16}''$ openings and of fairly strong wire, so that the wall member 12 will not be likely to be distorted by careless handling. The upper marginal edge portion 15 of the wire mesh tube can extend nearly to the upper rim of the main body wall 2; and, as shown, said upper edge portion is conventionally reinforced. Perforated sheet metal can be used to form the wall 12 instead of using wire mesh.

The spindle shaft 14 may be attached to the disc 11 by a nut 16 threaded to the upper end of the spindle, which nut clamps the disc against a flange 17 of the spindle and serves also as a knob in position to enable the entire rotor to be easily lifted out of the body 1 through the top. The spindle shaft has a cylindrical portion below the flange 17 adapted slidably to enter the inner race member of an antifriction bearing assembly 18 (hereinafter, for brevity—bearing 18) supported by the mottor wall 3 of the body 1, and, at its lower end, the spindle shaft has a cone point 19 constituting, with a conical seat element 20 suspended from the bottom wall 3, a footstep bearing for the spindle shaft.

The bearing 18 is preferably made of rust-resisting metal, for instance bronze, since it may sometimes be subjected to contact with water. The bearing 18 is so mounted in the bottom wall 3 as to be readily removable for cleaning purposes; and one manner of supporting it may comprise making a bracket 21 in the form of a tubular bearing housing removably connected with a thickened apertured boss portion 22 of the bottom wall 3—said housing containing the bearing 18 and embodying the seat element 20 of the footstep.

The seat element 20 has provision for drainage of water from the housing, including a small aperture 23 at the axis of the spindle shaft. There may be additional drain openings (not shown), in the footstep element 20.

The housing or bracket 21, as shown in Fig. 1, is enlarged to form an annular rest plate 24 for the outer race member of the bearing 18; threads at 25 for engaging complementary threads in the bottom wall 3, and a flange 26 by which the housing may be manipulated to enable ready removal of the bearing and housing assembly for cleaning.

The bearing 18 may be contained in a cushion ring 27, seated in the threaded portion of the housing 21; and, if the cushion ring is made of fairly live rubber, the ring may have an inturned flange portion 28 overhanging the bearing 18 and pressing upwardly resiliently against (e. g.) the flange 17 of the spindle shaft with sufficient force to preserve a seal thereagainst while not interfering with free turning of the rotor—thus preventing contact of water with the bearing 18. In such case the housing 21 could be wholly imperforate, so that water could not enter it at any place.

Fig. 3 shows a support for the spindle shaft and bearing similar to that just described, except that the footstep bracket is a metal strap 31. In event the main body is glass the strap 31 would be attached to the bottom wall 3 of the main body as by bolts 32 and appropriate cushion washers 33— e. g., rubber washers. In Fig. 3 the bearing 18 is shown as seated in a circular depression 34 of the bottom wall 3 (as in a cushion ring 35); and with the arrangement shown, one may reach the bearing 18 from the bottom side of the main body 1 in order to remove the bearing 18 for the purpose of cleaning it. After the rotor spindle shaft has been removed from engagement with the bearing 18, the bearing can be pushed out of its supporting socket by upward pressure thereon of a finger or suitable tool. The bracket 31 can be made of metal strip stock an inch or so wide in a machine for use in domestic kitchens.

An important feature of the invention is the manner of applying water for washing food products and turning the rotor. Essentially, this comprises projecting water as from a hose H (diagrammatically indicated in Fig. 1 only) into the rotor in a manner to agitate the contents of the rotor, causing the same to circulate therein and to present different surfaces successively to the cleaning action of the water on said contents. The most effective manner of injecting water thus far observed is to introduce it at the base of the rotor, so that it tends to be projected forcibly against the convex upper surface of the bottom wall thereof and (as shown by Fig. 2) at such an angle that the projected water will turn the rotor. Preferably water is projected upwardly at about a 10° angle relative to the horizontal as by a nozzle 40 Fig. 1 and at a sufficient angle relative to a vertical plane intercepting the nozzle and rotor axis (see Fig. 2) so that the rotor is certain to be kept in rotary motion.

Too much speed on part of the rotor will counteract the force of the projected water on the contents of the rotor because, if whirling rapidly enough, the perforate wall 12 will not enable projection of water through it. Since the most desirable angle of projection of water for turning of the rotor depends upon several factors including hydrostatic head in the supply system the angle of projection may be variable.

Referring further to Figs. 1 and 2, the nozzle 40 may comprise a metal tube having provision such as hose "threads" thereon at 41 for coupling a flexible hose thereto for conducting water to the nozzle. The opposite end of such hose can embody any suitable means for connection to a water tap for admitting hot or cold water (or a mixture of hot and cold water) thereto depending upon the fixtures available where the machine is used.

In case the body 1 is glass or a ceramic product the nozzle can be secured by bolts 42 and gaskets 43 and 44 (Fig. 2 particularly) or by means of a securing sleeve 45 (Fig. 4) of compressible material such as rubber inserted into the wall 2 at an opening directed at the proper angles relative to the rotor and said wall 2. If the wall 2 is metal—e. g., as in Fig. 5—the nozzle 40 may be welded or soldered in place. If adjustment is desired, or necessary, a universal mounting for the nozzle may be used, such as shown in Fig. 6. The latter shows a ball formation 45 of the nozzle 40, maintained in position between complementary seat flanges 46 and 47 of the body 2 and a connector 48 respectively. The flange of the connector 47 may be contractable so as to enable it to be clamped against the ball formation by a threaded nut or sleeve 49 on the flange 47 to hold the nozzle tightly in adjusted position. The nozzle may be restricted at its outlet to increase the velocity of water projected therethrough as suggested in Fig. 6 and/or "rifled" to project a whirling column of water.

The concavity on the under side of the disc 11 enables the bottom 3 of the body 1 to be raised with reference to the radially outward portions of the bottom, which latter has provision for rapid downward drainage in the form of large drain holes 50. The raised central portion of the bottom serves as a water shed. The construction described above permits ample spacing between the radial bearing 18 and the thrust or footstep bearing (19, 20), without having to provide excessively long legs 4 to support the body 1. The legs can be formed integrally with the container 1 or separately therefrom as desired.

In operation, vegetables such as spinach, beets, potatoes, etc., or fruit such as berries are placed directly in the container constituted by the walls 11 and 12 of the rotor 10 and washed by water projected from the nozzle 40 thereagainst. Water from the nozzle causes lifting of the contents of the rotor and agitation or tumbling thereof in the rotor, resulting in rapid cleansing of such food products. For grain products such as rice, a finer mesh basket 52 can be placed inside the rotor to prevent loss through the spaces provided by the coarser mesh of the wall 12 of the rotor. The bottom wall portion 54 of the basket 52 is preferably spaced upwardly from the imperforate wall 11 of the rotor, as evident from Fig. 1, in order that water may be more readily projected into the basket from its under side. The portion of the bottom of the basket 52 which is complementary to the convex upper side of the wall 11 of the rotor helps to center the basket. The basket, additionally may fit the rotor wall 12 at the upper rim of the basket.

Fig. 5 shows one manner of providing spaced bearings for the rotor at opposite effective ends thereof. Here the footstep bearing is a cone and socket, one element (e. g., cone 55) being carried directly on the bottom wall 3 and the coacting element (e. g., socket 56) on the bottom wall of the rotor. As shown, a knob 57 (corresponding to knob 16 of Fig. 1) is recessed on its under side to coact with the cone point 55. To center the upper part of the rotor the latter has a cover 58 fitted thereto as around the rim 59 of the cover, and the cover has a pin 60 loosely journaled in a socket element (e. g., knob 61) of the main cover 6. The upper extremity of the pin 60 is reduced in size so that it will have practically no frictional resistance to turning. The running fit between the pin 60 and socket element 61 has only to be sufficiently close so as to maintain the upper portion of the rotor out of contact with the adjacent side wall 2 of the body 1; hence the pin can be loose enough in the socket so that it will not bind in the event the cover 6 is improperly seated in place on the container 1. Holes 64 may be provided in the inner cover 58 to enable ready removal of said inner cover from the rotor 10—that is, in order that the user will not try to use the pin 60 as a handle for that purpose.

The cover 6 and centering bearing assembly for the upper portion of the rotor can also constitute a self-contained unit (not shown). For example the knob 61 can have a pin rigid therewith, extending downwardly therefrom and permanently attached to a member in the form of a spider with radially extending arms adapted to engage the upper rim of the rotor, as with a snap action, whereby to center the rotor 10 with reference to the cover 6 when the latter is applied to the container 1.

It will be obvious from the disclosure hereof that water can be introduced into the machine in ways other than as shown—for instance through the top of the container 1—in a manner to project water downwardly into the rotor in a direction to maintain agitation of products contained by the rotor and rotation of the rotor. I have, in fact, done this; but find that the manner of introducing water illustrated herein is very much more effective. Water introduced from above the contents of the rotor tends to pack such contents against the bottom of the rotor, whereas with the arrangement shown such contents are bodily lifted and freely circulated in the rotor.

Any of the various modifications herein shown or described may be used in a single embodiment of the invention.

I claim:

1. A machine for washing food products, comprising a container having an upright wall and a bottom wall, one of said walls having provision for downward drainage, a rotor mounted in the container for free rotation on a vertical axis, said rotor having an upwardly convex bottom wall and a perforate peripherally continuous side wall and being internally unobstructed, and a nozzle on the container adapted to project a forced concentrated stream of water onto products in the container, said nozzle having its axis disposed in a direction to project water through the perforate side wall and against the convex bottom wall nonradially to the axis of the rotor to effect impelling rotary movement of the rotor and agitation and washing of the food products.

2. A machine for washing food products, comprising a container adapted for downward drainage, said container having an upwardly convex bottom wall and a peripherally continuous side wall contiguous therewith, means to support the container in spaced relation to a horizontal surface, said bottom wall having drain holes, a rotor having a perforate wall, and upwardly convex bottom wall, vertically spaced bearing means in the container adapted to support the rotor for free rotation in the container, and means to enable projection of fluid into the container through the perforate wall toward the convex bottom wall of the rotor and eccentric to the rotor axis so as to turn the rotor.

3. A machine for washing food products comprising a container having a side wall and bottom portion and provision for downward drainage at its bottom portion, nozzle means arranged to project a forced concentrated stream of water into the container at an angle removed from the central axis of the container, a rotor in the container having an imperforate bottom wall disposed at an acute angle in a vertical plane intercepting the nozzle axis and a perforate side wall, said rotor having an unobstructed interior for containing products to be washed and to enable said products to tumble freely therein.

WILLIAM H. CURTIS.